Oct. 22, 1929.  E. H. COQUILLE  1,732,673
REAR LANTERN FOR MOTOR VEHICLES
Filed Jan. 25, 1928

E. H. Coquille
INVENTOR

By Marks & Clerk
Attys.

Patented Oct. 22, 1929

1,732,673

UNITED STATES PATENT OFFICE

EMILE HENRI COQUILLE, OF PARIS, FRANCE

REAR LANTERN FOR MOTOR VEHICLES

Application filed January 25, 1928, Serial No. 249,444, and in France September 29, 1927.

The present invention relates to a rear lantern device for motor vehicles, which is chiefly of use when the vehicle is provided with a tool box, or the like, at the back.

The said lantern device comprises a lantern which is principally characterized in that it is mounted on the rear panel of the box, in such manner as to serve for lighting the interior of the box, while serving as a rear lantern and optionally as a side light for the lighting of the regulation number plate.

According to another characteristic of the invention, the body of the lantern may be formed by the pressing process in the panel itself.

In the appended drawings given by way of example,

Figure 1:
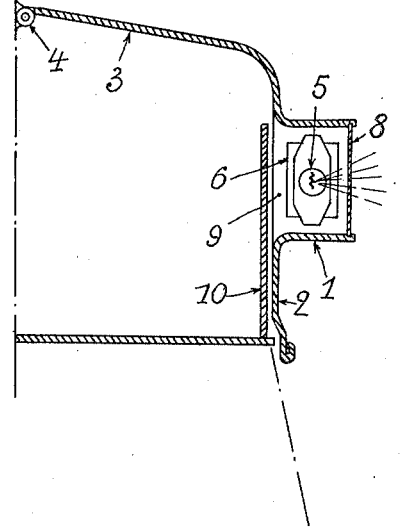
Figure 1 is a vertical section of the tool box and the lantern, with the box in the closed position.
Figure 2:
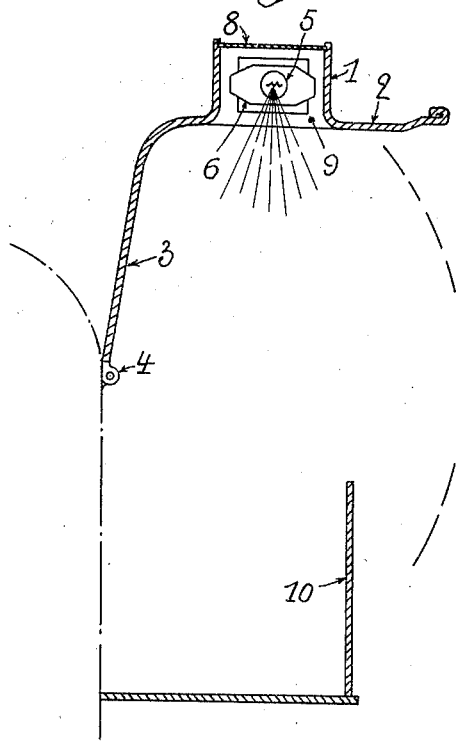
Figure 2 is a vertical section of the tool box and the lantern, with the box in the open position.
Figure 3:
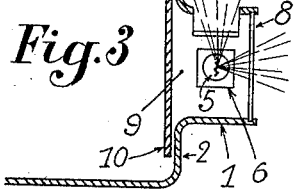
Figure 3 is a horizontal section of the tool box and the lantern.

In the constructional form shown in Figs. 1, 2 and 3, the main body 1 of the lantern is formed by pressing the panel 2 of the tool box, said panel being secured to the cover 3. The whole device can be raised as shown in Fig. 2, by pivotation on the horizontal axis 4. The said lantern carries an electric lamp 5.

The main body 2 of the lantern is laterally apertured at 6 for lighting the regulation plate 7. For this purpose the lantern is preferably formed by pressing into the side of the panel, thus leaving the middle of the panel free for the mounting of the said regulation plate.

The rear side of the lantern is open and is provided with a transparent red plate 8 for the rear light. The front part 9 remains entirely open, thus affording access to the lamp and also lighting the interior of the tool box, when the panel 2 is raised (Fig. 2).

It is preferable to employ a vertical plate 10, secured to the base, to reinforce the rear panel, so that the tools in the box will not break the lamp.

Figure 4:
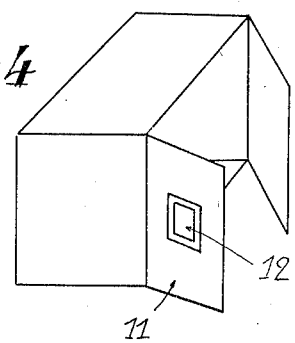
Figure 4 is a perspective view of a box of a different form which is provided with the said lantern.

In the present example, the rear panel of the box is secured to the cover and is raised with the latter, but it is obvious that the said lantern may be placed upon boxes of different construction. As shown in the modification Fig. 4, it may be placed at 12 on one of the two side pieces 11 forming the rear panel and pivoting on vertical hinges. It may further be mounted on the stationary rear panel, and herein the box cover is limited to the top face.

Obviously, the invention is not limited to the constructional details herein described and represented, which are given by way of example. In this manner the main body of the lantern need not be formed by the pressing process, but it may be separately secured to the panel by any suitable means such as rivets, bolts and nuts, soldering, or the like. In this case, the panel should be apertured so as to form the opening 9, which in the preceding example is formed by the pressing process itself.

Having now described my invention what I claim as new and desire to secure by Letters Patent is:

1. A combined rear lantern and rear box arrangement for motor vehicles comprising a rear box having an aperture through a wall thereof and a rear lantern secured to said wall, said lantern being adapted to provide for the rear signal of the vehicle and to illuminate the interior of said box through said aperture.

2. A combined rear lantern and rear box arrangement for motor vehicles comprising a rear box having an aperture through a wall thereof, a rear lantern secured to said wall, and adapted to illuminate the interior of said box through said aperture, a license plate carried by said box adjacent said lantern, and openings in the body of said lantern, whereby the latter is adapted to provide for the rear signal of the vehicle and to illuminate said license plate.

3. A combined rear lantern and rear box arrangement for motor vehicles comprising a rear box having an aperture through a wall thereof, a rear lantern secured to said wall, the body of said lantern being made of a stamped recess in said wall and said lantern being adapted to provide for the rear signal of the vehicle and to illuminate the interior of said box through said aperture.

4. A combined rear lantern and rear box arrangement for motor vehicles comprising a rear box, a hinged cover for said box having an aperture therein directed towards the rear of the vehicle, a rear lantern secured to said cover and registering with said aperture, said lantern being adapted to provide for the rear signal of the vehicle and to illuminate the interior of said box through said aperture.

5. A combined rear lantern and rear box arrangement for motor vehicles comprising a rear box, a hinged cover for said box, a lantern secured on the rear panel of said cover and provided with an aperture directed towards the rear of the vehicle to provide for the rear signal of the vehicle, and with an aperture directed towards the interior of said box, so as to illuminate the same.

In testimony whereof I have signed my name to this specification.

EMILE HENRI COQUILLE.